US006906019B2

(12) United States Patent
Nitzan et al.

(10) Patent No.: US 6,906,019 B2
(45) Date of Patent: Jun. 14, 2005

(54) PRE-TREATMENT LIQUID FOR USE IN PREPARATION OF AN OFFSET PRINTING PLATE USING DIRECT INKJET CTP

(75) Inventors: Boaz Nitzan, Ganey-Tikva (IL); Moshe Frenkel, Jerusalem (IL)

(73) Assignee: Aprion Digital Ltd., Netanya (IL)

( * ) Notice: Subject to any disclaimer, the term of this patent is extended or adjusted under 35 U.S.C. 154(b) by 25 days.

(21) Appl. No.: 09/822,500

(22) Filed: Apr. 2, 2001

(65) Prior Publication Data

US 2002/0139270 A1 Oct. 3, 2002

(51) Int. Cl.[7] .............................................. C09D 11/00

(52) U.S. Cl. ....................... 510/174; 510/212; 510/407; 510/506; 134/38; 106/31.32

(58) Field of Search ................................ 510/174, 212, 510/407, 506, 238, 245, 201, 202, 170, 365, 384, 505; 134/38; 106/31, 32

(56) References Cited

U.S. PATENT DOCUMENTS 4,003,312 A 1/1977 Gunther
4,247,328 A * 1/1981 Lawson et al. ................ 106/2
4,381,185 A 4/1983 Swanson
4,390,369 A 6/1983 Merritt
4,484,948 A 11/1984 Merritt
4,540,448 A * 9/1985 Gautier et al.
4,560,410 A * 12/1985 Burns et al. ................... 106/2
4,593,292 A 6/1986 Lewis
4,718,340 A 1/1988 Love, III
4,833,486 A 5/1989 Zerillo
5,064,749 A * 11/1991 Matsumoto et al.
5,312,654 A 5/1994 Arimatsu et al.
5,339,737 A 8/1994 Lewis
5,353,705 A 10/1994 Lewis
5,487,338 A 1/1996 Lewis
5,495,803 A 3/1996 Gerber
5,738,013 A 4/1998 Kellett
5,750,314 A 5/1998 Fromson et al.
6,017,968 A * 1/2000 Beggs et al.
6,121,219 A * 9/2000 Herdt et al.
6,182,571 B1 * 2/2001 Jolliffe et al. ............... 101/465

FOREIGN PATENT DOCUMENTS

| | | | |
|---|---|---|---|
| EP | 0503621 A1 | | 9/1992 |
| EP | 0533168 A1 | | 3/1993 |
| EP | 0697282 A1 | | 2/1996 |
| GB | 1492529 | * | 11/1977 |
| JP | 10-24549 | | 1/1998 |
| JP | 10-76624 | | 3/1998 |
| JP | 10-76625 | | 3/1998 |
| JP | 10-157053 | | 6/1998 |
| SU | 1057453 | * | 11/1983 |
| WO | WO 01/49506 A2 | | 7/2001 |

* cited by examiner

*Primary Examiner*—Gregory Webb
(74) *Attorney, Agent, or Firm*—Edward Langer, Pat. Atty.; Shiboleth, Yisraeli, Roberts, Zisman & Co.

(57) ABSTRACT

A method of making a printing plate in which the uncoated surface of a substrate is treated with a pre-treatment solution prior to the deposition of ink on the surface. The pre-treatment liquid comprises a polyvalent metal salt, and at least one of an organic swelling reagent and/or a coalescence reagent. The pre-treatment liquid is applied to form a thin, homogenous layer of approximately 4 $\mu$m to the entire upper surface of the recording plate. The swelling reagent and/or the coalescence reagent and the polyvalent metal cations are physically well localized in the porous structure of the plate's surface. After partial drying of the pretreated anodized aluminum plate, CTP liquid is deposited onto the surface to form an image. The CTP liquid solids react with the pre-treatment liquid and are, therefore, chemically bound to the surface. This allows all data to be deposited in a single pass of the inkjet head without the problem of clustering.

15 Claims, 6 Drawing Sheets

PRE-TREATMENT LIQUID FOR USE IN PREPARATION OF AN OFFSET PRINTING PLATE USING DIRECT INKJET CTP

FIELD OF THE INVENTION

The present invention relates to a plate making method, and more particularly, to a surface treatment of the plate surface, prior to the deposition of ink on the media.

BACKGROUND OF THE INVENTION

Offset lithographic printing has remained a most popular method of printing for many years. An important reason for this is the relative ease with which offset lithographic printing plates can be produced. Currently, the most widely used method for plate preparation has remained that which utilizes specially prepared masking films through which pre-sensitized printing blanks are selectively hardened or softened (according to the chemistry of the plate) by exposure to ultra violet light. The plate then undergoes a development process, during which the more soluble regions of the plate are washed away. A detailed description of the system and the plates used can be found in Chapter 20 of the book *Printing Materials: Science and Technology* by Bob Thomson 1998, published by Pira.

In recent years, various considerations have arisen that point to advantages for modification of hitherto generally accepted practices. With the advent of computers, information for printing is prepared digitally and it has become preferable to use this digital information as directly as possible in plate preparation. One obvious way would be to eliminate the masking film. Not only are these films a source of expense, but the most widely used films are based on silver chemistry whereby the exposure and handling of the film must be in a light-excluding environment. In addition, the exposed film must be processed with chemical solutions, which are unstable, messy and environmentally problematic.

One method which avoids these problems is found in computer-to-plate (CTP) systems where the offset litho plates are directly imaged with a light source that is modulated to correspond to the digital information from the computer. Thus the film intermediate is completely eliminated. In general, such plates still need processing by solution although attempts are being made to develop computer-to-plate systems that are processless. The subject of computer-to-plate can be found in the above quoted book in Chapter 21.

U.S. Pat. No. 5,339,737 to Lewis et al describes the processless preparation of offset litho printing plates, wherein the upper layer or layers of the plate are ablated away. The upper layer is either oleophobic for waterless plates or hydrophilic for conventional wet process plates. The substrate is oleophilic in both cases. U.S. Pat. No. 5,353,705 to Lewis et al is similar to the previous patent but describes additional layers for secondary partial ablation. U.S. Pat. No. 5,487,338 is similar but includes reflective layers. All of these inventions involve multiple layered plates that are expensive to produce. Also, it is difficult to maintain a consistent standard of quality from plate to plate. Moreover, they utilize laser imaging systems which are in themselves costly.

Therefore, it would be desirable to have a simplified, quick plate making process with elimination of all chemical processing and a minimal cost for the equipment for plate production and for the plate production itself.

A technology that has been developed in recent years may be seen to offer solutions to easy and inexpensive plate production. This is the technology of inkjet printing.

Inkjet is a non-impact printing process whereby ink is sprayed through very fine nozzles and the resultant ink droplets form an image directly on a substrate. There are two main types of ink jet processes. In one process, usually termed continuous ink-jet printing, a stream of ink drops are electrically charged and then are deflected by an electric field either directly or indirectly onto the substrate. The viscosity of inks used in such systems is typically 2 or 3 centipoise. In the second process, usually called Drop on Demand (DOD) inkjet printing, the ink supply is regulated by an actuator such as a piezoelectric actuator. The pressure produced during the actuation forces a droplet through a nozzle onto the substrate. Inks for DOD ink-jet printing do not need to be conductive and their viscosity is typically between 2 and 40 centipoise.

Several inventors have tried to apply the principles of ink-jet printing to offset plate making. U.S. Pat. No. 4,003,312 was one of the first patents to recognize the advantages of using inkjet printing technology in a process for preparing a waterless lithographic printing plate. This patent discloses the use of an inkjet printing apparatus to deposit a background coating of silicone being curable.

U.S. Pat. No. 4,718,340 discloses a method for preparing a reusable planographic plate for lithography printing wherein a hydrophilic substrate is provided with a thin hydrophobic layer which is selectively removed. This process involves a multi-step plate preparation using hydrophobic organic acids and derivatives thereof. The treated surface is then selectively imaged with a spark discharge, or laser ablation technique. This has limited run length capability, similar to other spark discharge and laser ablation techniques.

U.S. Pat. No. 5,312,654 discloses a method for making a printing plate wherein an ink absorbing layer is selectively imaged with photopolymerizable composition using an ink-jet printer. The ink absorbing layer prevents the ink from spreading and is removed after the ink is cured by exposure to actinic light, thereby exposing a hydrophilic surface where photopolymer has not been deposited. This process is impractical because the water-soluble or alkali-soluble coating used in the ink-absorbing layer has serious disadvantages since the ink imaged photopolymer sits on top of this layer. On typical offset press, the use of an aqueous fountain solution would be disastrous for this plate. Additionally, the ink absorbing properties of this film limit control of dot or image formation and the resolution of fine details is still problematic.

U.S. Pat. No. 5,750,314 to Fromson et al. describes selective positive imaging on a substrate coated with a first continuous layer of a material, and further coated by inkjet with a second material, which is adhesive to the first layer. The difference in solubility of each material in a specific solvent enables developing and removing the non-imaged layer of the first material. In this method the substrate is made hydrophilic. The first material is preferably a negative working photopolymer. The disadvantage of this method is that after masking the imaged area, the plate needs to be exposed and developed.

Japanese Patents JP10,157,053, JP 10,076,624 and JP 10,024,549 describe a method which involves injecting oily ink through a nozzle and forming an image on an image forming layer of an original plate. Resin is impregnated in the non-image formation area of the image-forming layer. The non-image formation area is desensitized by subjecting the resin to chemical reaction, to form a flat printing plate.

JP 10,076,625 involves performing thermofusion of solid ink composition at normal temperature. Ink is injected from a nozzle on to an intermediate transfer object and an image is formed. Then, contact transfer of the image from the intermediate transfer object to the image acceptance layer of an original plate is carried out. The area where the image is not formed in the image acceptance layer is processed by chemical reaction and it is formed on the waterproof support body that has resin.

U.S. Pat. No. 4,833,486 to Zerillo (assigned to Dataproducts) utilizes a hydrophobic solid inkjet ink (containing waxes) which is held at a sufficiently high temperature to jet it through a DOD head. (This solid ink technology is more fully described in U.S. Pat. Nos. 4,390, 369, 4,484,948, and 4,593,292.) The substrate is a hydrophilic offset plate—either paper or aluminum onto which the image is jetted. When the ink hits the plate it immediately cools and solidifies. One problem of such an approach is the difficulty of obtaining sufficiently good adhesion of the waxes of the ink to the plate to run multiple impressions during lithographic printing.

European Patent EP503621 (Applicant NIPPON PAINT CO) describes two approaches. One approach describes jetting inks onto a pre-sensitized plate, which then needs further treatment, including a developing stage with a liquid developer. The other approach uses a non-presensitized plate and the inkjet ink is photosensitive so that it can be hardened on the plate.

EP533168 to Nippon describes the use of a photopolymeric based inkjet ink together with an ink absorbing layer on the litho plate surface.

EP697282 to Leanders (Agfa) describes a two component system whereby one reactive component is in the ink and the other in the litho plate surface, so that when the ink is deposited on the plate it produces an oleophilic reduced silver image that can be used in the offset printing process.

U.S. Pat. No. 5,495,803 to Gerber describes imaging a coated, presensitised plate with a UV opaque hot-melt inkjet ink and using the ink as a photomask to expose the plate. The unexposed presensitised polymer and the ink are subsequently removed by washing.

U.S. Pat. No. 5,738,013 to Kellet describes an ink-jet plate-making process involving the use of a reactive inkjet ink which is bonded to the litho plate by a chemical reaction activated by radiant energy. This assumes that such inks have very good stability at room temperature so that no jet blocking will occur, yet have good reactivity at high temperatures so that the ink becomes insoluble with good adhesion to the offset plate and with good oleophilic properties.

Another option is coating the substrate with solution containing cationic surfactants, as described in U.S. patent application No. 60/174,713, assigned to the owners of the present invention. According to this method the surface of a substrate, bare anodized aluminum with no pre-coating (as polymeric binder that should be washed away), is coated with a very thin layer (almost mono-molecular) of cationic surfactants. The coating is water repellent and insoluble in the CTP liquid. The plate is then imaged using an inkjet printing head providing an excellent image quality and a strong stable oleophilic image from which to print high numbers of good quality impressions.

However, these prior arts attempts to use the inkjet process for imaging plates, remain with difficulties in producing satisfactory quality, run length and plate-making speed, because of problems of spreading and clustering.

In order to produce high-resolution plates at high speed it is necessary to position large number of droplets in rapid succession very close together. Creating an image on a highly hydrophilic, water receptive surface of an anodized aluminum offset plate with water-based liquid by means of an ink jet process, is very problematic. The high surface energy of the anodized grained aluminum causes an intensified spreading of the liquid drops. Therefore, it is almost impossible to create a sharp image on the plate. Both water-based and solvent-based inks have problems of spreading of the liquid on the high surface energy hydrophilic plate surface due to the properties needed to jet the ink.

In addition, water-based inks, due to the hydrophobic nature of the plate's coating, tend to create a clustering phenomenon at the dark tone areas of the image (shadows). Prior art methods, in order to contend with the problem of clustering, have required multiple passes of the inkjet head with a drying step between the passes. This makes the plate preparation time quite long.

One option of controlling the spreading of drops is by controlling the viscosity of the CTP liquid, as described in Israel patent application No. 132789 and the parallel PCT application PCT/IL 00/00722. This application describes the use of polymer emulsion in water to produce good quality long run lithographic printing plates. Yet the resolution received is plate dependent, i.e. with certain substrates this is more successful than with others.

U.S. Pat. No. 4,381,85 discloses a simple process to obtain a water-fast print on paper using a colorant solution containing water-soluble polymeric dyes. This is accomplished by using a paper employing substantial cation content, especially a substantial polyvalent metal ion content for example, $Fe^{2+}$, $Fe^{3+}$, $Cu^{2+}$, $Zn^{2+}$, $Al^{3+}$, $Mg^{2+}$, $Ca^{2+}$and $Ba^{2+}$, and applying a solution containing one or more polymeric colorants possessing anionic net charge, for example, anionic groups. The reaction between the cations and anions immobilize the ink drops on the surface where they are applied so that spreading does not occur.

It would be desirable to provide an offset printing plate for direct inkjet CTP which would not have the problems of spreading and clustering and which would provide an easy, economical method for plate preparation.

SUMMARY OF THE INVENTION

Accordingly, it is a broad object of the present invention to overcome the problems of the prior art and provide a method for selective positive imaging of a suitable coated anodized aluminum offset plate using a water based CTP liquid (as described in Israel patent application No. 132789 (and the parallel PCT application PCT/IL 00/00722), and U.S. application No. 60/174713 by means of inkjet process.

The inventors have found that the image quality on the plate can be further improved, and the speed of plate preparation can be elevated by treating the anodized aluminum plate with a pre-treatment liquid that interacts immediately, both chemically and physically with the CTP liquid to form a stable image with no clustering phenomenon. According to the present invention the surface of a substrate such as, bare anodized aluminum with no pre-coating, is treated with a pre-treatment solution prior to the deposition of the ink on the surface.

The inventive pre-treatment liquid is an aqueous and/or alcoholic solution or an oil in water emulsion (where the oil is a non-miscible swelling reagent) containing a polyvalent metal salt, and at least one of an organic swelling reagent and/or a coalescence reagent. The pre-treatment liquid is applied to form a thin, homogenous layer of approximately 4 μm to the entire upper surface of the recording plate. The swelling reagent and/or the coalescence reagent and the polyvalent metal cations, in the pre-treatment liquid, are physically well localized in the porous structure of the plate's surface. After partial drying of the pre-treated anodized aluminum plate, CTP liquid is deposited onto the surface to form an image. The CTP liquid solids react with the pre-treatment liquid and are, therefore, chemically bound to the surface. This allows all data to be deposited in a single pass of the inkjet head without the problem of clustering. The solids in the CTP liquid precipitate in response to the localized cations deposited in the pre-treatment, and form interactions above and in the pores of the surface of the plate to give a mechanically stable ink dot. After post-print drying at temperatures high enough to evaporate the swelling reagent and/or the coalescence reagent, the ink dot remains mechanically bound to the surface of the media.

Other features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF A PREFERRED EMBODIMENT

Figure 1A:
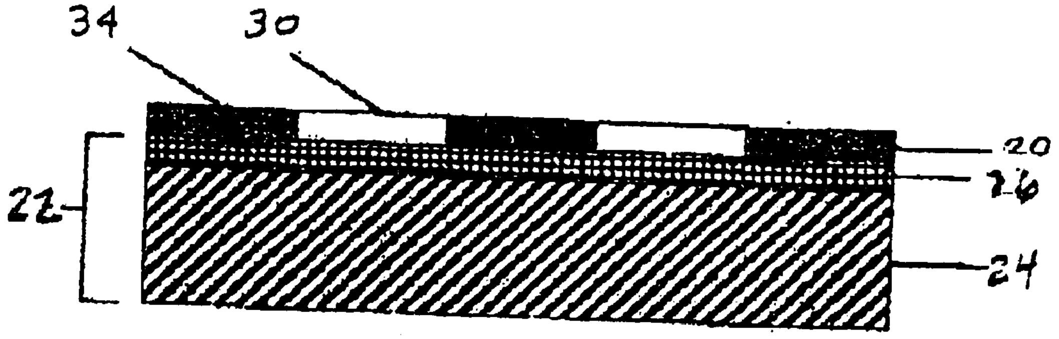
FIG. 1A (PRIOR ART)
FIGS. 1A–C show an enlarged sectional view of a negative working printing plate as known in the prior art.
Figure 1B:
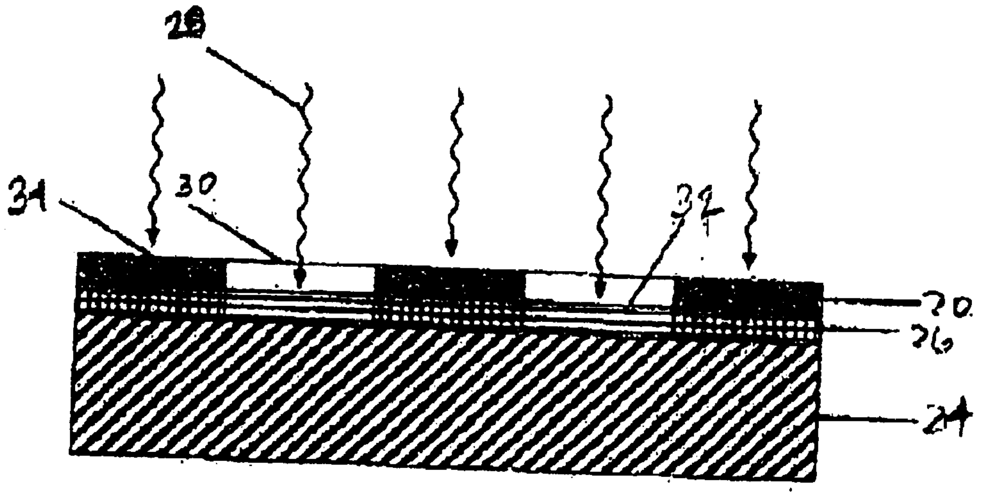
FIG. 1B (PRIOR ART)
Figure 1C:
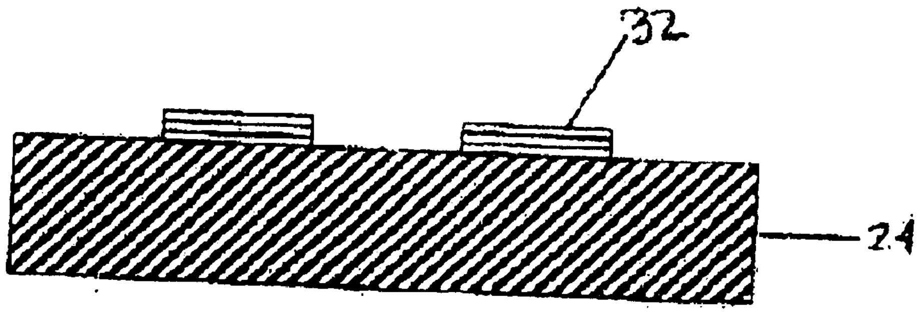
FIG. 1C (PRIOR ART)

Referring now to FIGS. 1A–C, there is shown an example of the widely used prior art process of platemaking with pre-sensitized plates. As shown in FIG. 1A, film 20 contains in negative form the image to be printed. Film 20 is used to image pre-sensitized printing plate 22. Plate 22 consists of a grained anodized aluminum substrate 24 which has been coated with coating 26 which contains a photosensitive pre-polymer with a carrier resin. Film 20 is placed in emulsion-to-emulsion contact with the pre-sensitized plate 22 and flood-irradiated with ultraviolet light (UV) 28 as shown in FIG. 1B. Transparent areas 30 of negative film 20 represent the image areas to be printed and permit the penetration of UV light 28 causing photopolymer coating 26 to form hard, insoluble oleophilic area 32. Black areas 34 of film 20 corresponding to the background areas of the print, prevent UV light 28 from penetrating and photopolymer coating 26 remains in the prepolymer state. Negative film 20 is then removed and the plate is processed—usually with a high pH aqueous solution in which the unpolymerized portions of coating 26 are readily soluble. This exposes the grained anodized surface of aluminum substrate 24 and provides the hydrophilic background areas for the printing plate, as shown in FIG. 1C.

Figure 2A:
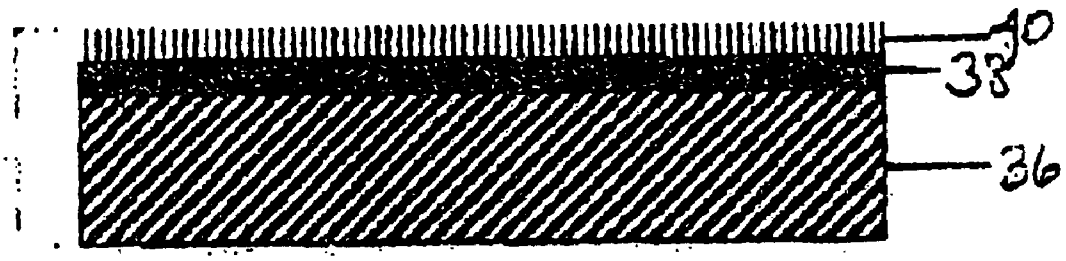
FIG. 2A (PRIOR ART)
FIGS. 2A–C show a prior art laser ablation process used in imaging infrared sensitive computer-to-plate litho plates.
Figure 2B:
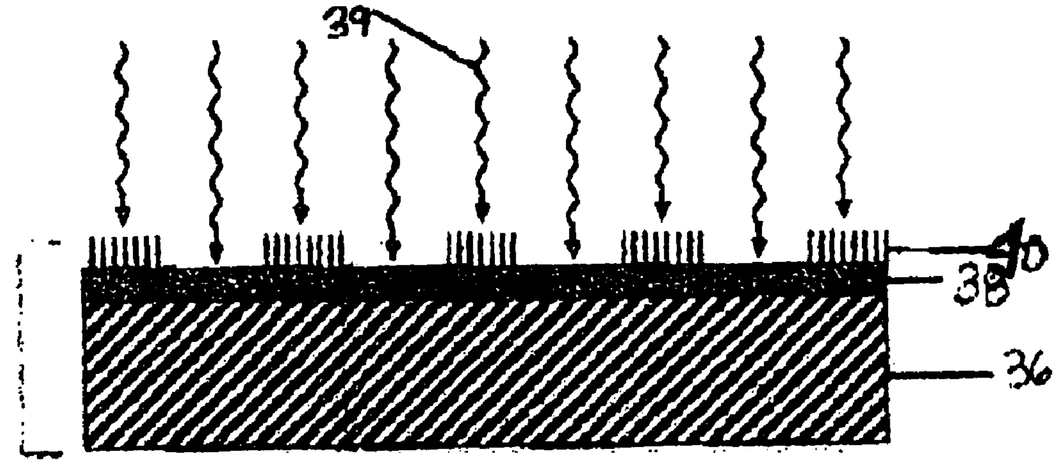
FIG. 2B (PRIOR ART)
Figure 2C:
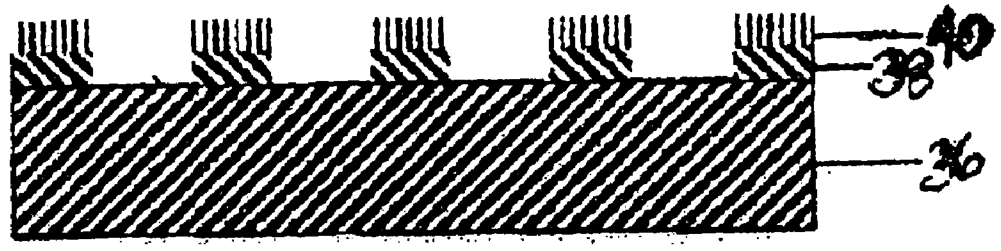
FIG. 2C (PRIOR ART)

FIGS. 2A–C show a simplified infrared ablatable computer-to-plate process as known in the prior art. In FIG. 2A, plate substrate 36, which may be, by way of example, aluminum, is coated with an infrared (IR) absorbing coating 38. Another possible plate substrate is polyester. Layered on top of coating 38 is hydrophilic coating 40. Plate substrate 36 is imaged by digitally modulated IR radiation 39 that is absorbed by layer 38 as shown in FIG. 2B. The energy absorbed causes an extremely fast rise in temperature, resulting in ablation of IR absorbing coating 38, which causes hydrophilic coating 40 to also be removed. FIG. 2*c* shows the resulting plate substrate 36 with coating 40 providing the hydrophilic background areas of the plate and the exposed parts of the surface of plate substrate 36 providing the oleophilic image parts of the plate.

Figure 3A:
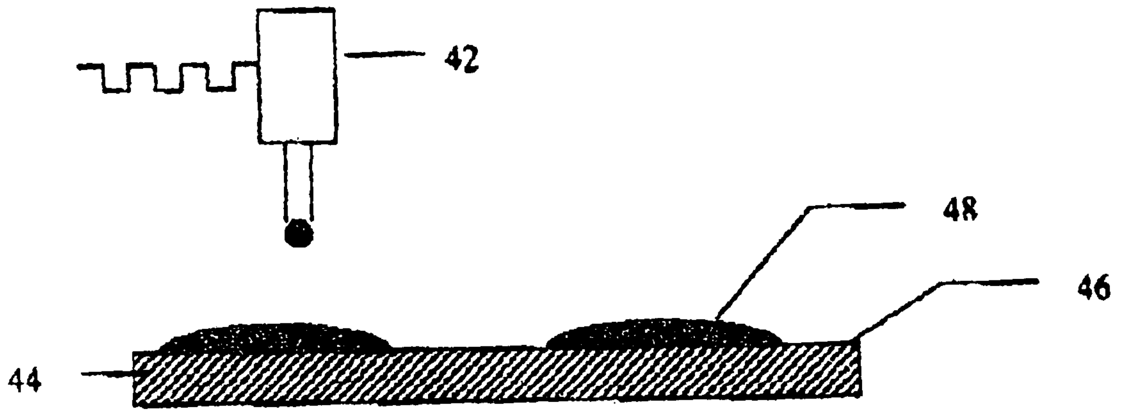
Fig. 3A (PRIOR ART)
FIGS. 3A–B show the drop-wise deposition of the inkjet fluid on an uncoated plate according to a prior art method.

FIG. 3A shows the prior art method of ink jet system 42 jetting fluid onto the surface of uncoated plate substrate 44. This plate substrate may be any type of substrate known to the art from which offset litho plates are fabricated. It must have a hydrophilic surface with no pre-coating on it. The preferred substrate is aluminum-based with grained, anodized surface 46. Although any type of ink jet system is useful in this invention, the figure shows a generic impulse (drop-on-demand) system 42 as this is the preferred system. The inkjet fluid is deposited in a pattern that is digitally determined to provide the information that will be contained in the plate directly from a computer.

Due to the high surface energy of anodized grained aluminum surface 46, spreading of the water-based liquid drops 48 occurs. Spreading can be restrained by the viscosity of the CTP liquid, as described in Israeli Patent Application No. 132789 (and the parallel PCT application PCT/IL 00/00, 722). This application describes a method whereby the surface area of the drop can be limited by a change in the liquid's viscosity, yet the viscosity change mechanism for drop-restraining is plate-dependent, i.e. the same ink will give different results on different substrates or substrate finishes.

Figure 3B:
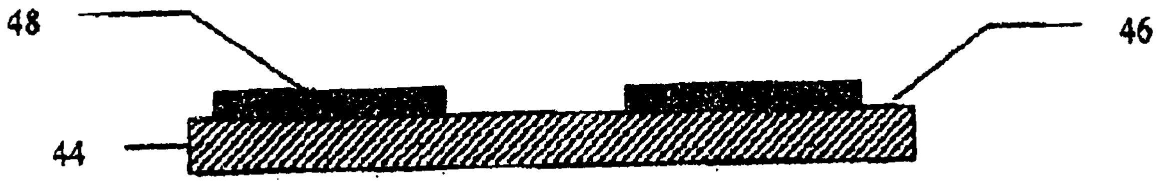
Fig. 3B (PRIOR ART)

After fluid deposition on plate substrate 44, plate 44 is heated to evaporate the water in the fluid and to fuse the resins to the substrate's grained anodized surface 46 to create a hydrophobic ink receptive image as shown in FIG. 3B.

Figure 3C:
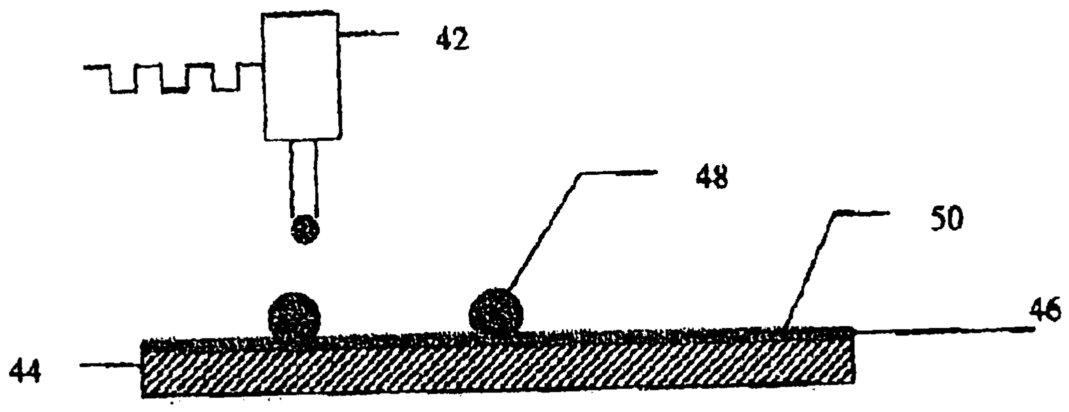
Fig. 3C (PRIOR ART)
FIGS. 3C–E show the drop-wise deposition of the ink jet fluid on a plate coated with solution containing cationic surfactants according to a prior art method.
Figure 3D:
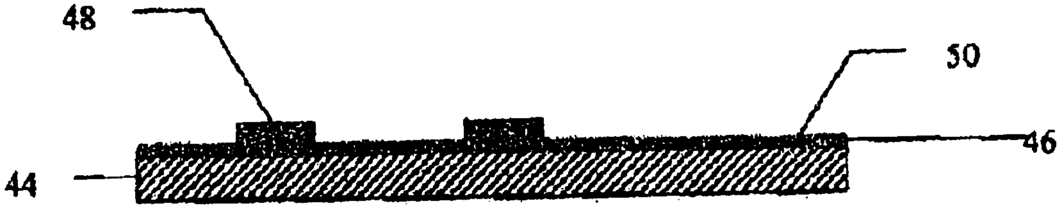
Fig. 3D (PRIOR ART)

Quality can be further improved by coating substrate 44 with a solution containing cationic surfactants as described in U.S. patent application No. 60/174713. FIG. 3C shows an inkjet system 42 depositing CTP liquid on a plate substrate 44 with grained anodized surface 46 which is coated with a very thin layer (almost monomolecular) of cationic surfactants 50. Due to the low surface energy of coated surface 50 of anodized grained aluminum surface 46, it is water repellent. Therefore, the spreading of water-based CTP liquid drops 48 is limited, meaning that the contact angle of the CTP liquid drop 48 with the interface of grained anodized aluminum 46 becomes high, as a result the spot size becomes very small and the image quality is further improved. The coating mechanism of controlling the drop spreading is not plate-dependent, so that the plate effect is cancelled. After fluid deposition, on the plate substrate 44, plate substrate 44 is heated to evaporate the water in the fluid and to fuse the resins to the substrate's coated grained anodized interface 46 to create an excellent image quality and a strong stable oleophilic image as shown in FIG. 3D.

Figure 3E:
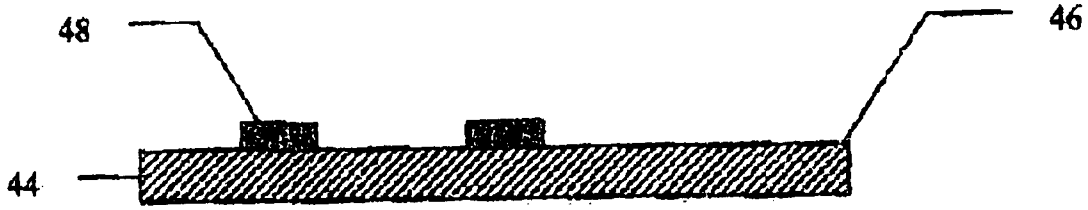
Fig. 3E (PRIOR ART)

After drops 48 are fused, arabic gum solution is applied to plate 44, as known in the art. Plate 44 is then placed on an offset printing machine and surfactants 50 are washed by the fountain solution prior to the printing procedure, so as to expose the grained anodized water-receptive surface 46 without causing damage to the image (FIG. 3E).

Figure 4A:
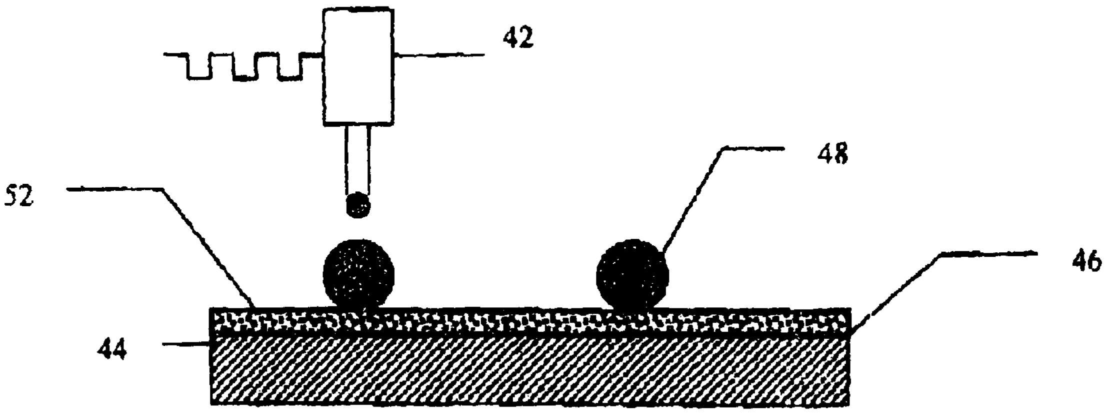
FIGS. 4A–D illustrate the anodized aluminum plate surface treatment, of the present invention.

The present invention is described in FIGS. 4A–D. FIG. 4A shows an ink jet system 42 which is jetting fluid drops 48 onto the surface of standard anodized grained aluminum plate 44 having a high surface energy, which has been pretreated with pre-treatment liquid 52 of the present invention. Pre-treatment liquid deposition onto offset plate surface 46 may be carried out by applying a thin layer (not more than 4 $\mu$m, wet). CTP pretreatment liquid 52 comprises a polyvalent metallic salt or an inorganic acid, and a water-soluble polymer swelling reagent and/or a coalescence agent.

The polyvalent metal salt in pre-treatment liquid 52 is comprised of divalent or higher polyvalent metallic ions and anions bonded to the polyvalent metallic ions and is soluble in water, alcohol or a mixture of both. Specific examples of polyvalent metallic ions include divalent metallic ions, such as a $Ca^{+2}$, $Zn^{+2}$, $Ba^{+2}$, $Mg^{+2}$, and trivalent metallic ions such as $Al^{+3}$, $Fe^{+3}$ and $Cr^{+3}$. Anions include $Cl^-$, $I^-$, $Br^-$, $NO_3^-$, $HCOO^-$, $CH_3CH_2COO^-$and $CH_3COO^-$. A metal salt comprised of the metallic ions $Zn^{+2}$ and $Ca^{+2}$, provides especially favorable results in terms of image mechanical stability. The concentration of the polyvalent metal salt in pre-treatment liquid 52 may be suitably determined so as to attain the effect of providing a good print and a high speed of plate production, e.g. prevention of clustering phenomenon at the shadows. It is, however, preferably approximately 0.1% to 30% by weight, more preferably approximately 2% to 25% by weight.

An inorganic acid such as phosphoric, sulfuric, nitric or hydrochloric acid can also be used instead of the polyvalent metal salt as the cation donor. The pH of this acidic pre-treatment solution can vary between 1–4, preferable pH is between 1–2.

According to the present invention, the polyvalent metal salt anions are preferably a chloride ($Cl^-$) or an acetate ($CH_3COO^-$), for optimal thermal stability.

Figure 4B:
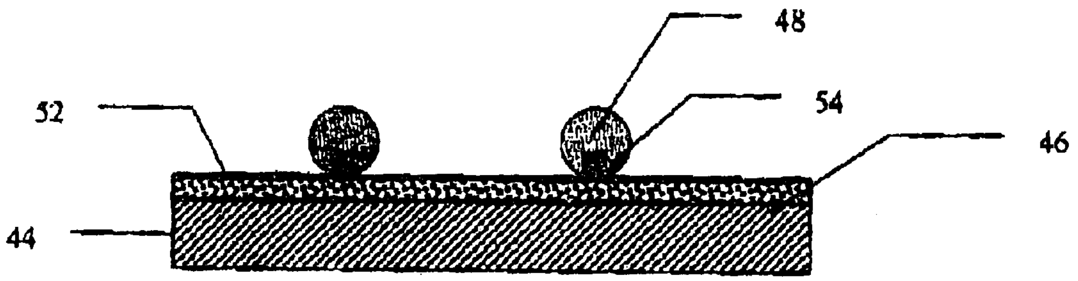

According to a first embodiment of the present invention, pre-treatment liquid 52 comprises a swelling and/or coalescence reagent. The presence of a swelling/coalescence reagent, which diffuses within the CTP liquid, enables the creation of stable dot shape 54 (as seen in FIG. 4*b*) with good film properties with very good adhesion to anodized aluminum surface 46. These good film properties promote the mechanical stability of dot 54 and consequently of the entire image. Preferred examples of the swelling reagent are N-methyl pyrrolidone, esters such as ethyl acetate, propyl acetate, butyl acetate, ethyl lactate, butyl lactate etc, ketones such as acetone and methyl-ethyl-ketone (MEK) and cyclic ethers such as THF. Butyl glycol, Butyl carbitol, di(propylene glycol) methyl ether (DPM), tripropylene glycol mono methyl ether (TPM), propylene glycol mono methyl ether, propylene glycol mono propyl ether, dipropylene glycol dimethyl ether. The concentration of the coalescence reagent in the pre-treatment liquid may be suitably determined so as to attain the effect of providing a good print quality with a highly mechanical stable image and no negative effect on the recording media. It is preferably approximately 0.1% to 15% by weight, more preferably approximately 0.5% to 12% by weight. Swelling reagents and coalescence reagents may be used together. After the pre-treatment liquid is applied, the surface is allowed to partially dry.

FIG. 4B demonstrates the formation of ink dot 54 by a phase separation mechanism. Dot 54 is composed of the resin and colorant found in the CTP liquid and is attached by high adhesion forces onto the porous surface 46, of the grained anodized aluminum plate, 44. The presence of the coalescence reagent and polyvalent metal salt of the pre-treatment liquid 52 are attached (in and on top) to the porous surface 46, causing a fast phase separation of the resin and colorant from the CTP liquid 52, and creating stable dot shape 54 with good film properties.

Figure 4C:
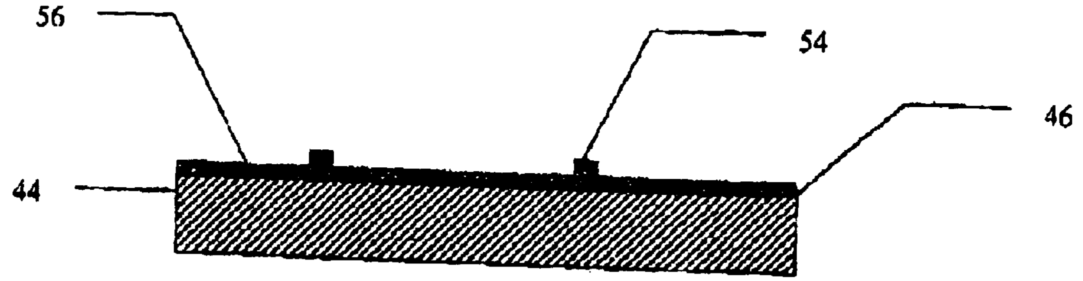

FIG. 4C illustrates printed ink dot 54 on dried surface 46. After dot formation the plate is dried at high temperatures to evaporate all liquids, including CTP liquid 52 swelling reagent and/or coalescence reagent leaving a thin layer of metal salt ions 56, on the surface. Dot 54 is trapped in porous surface 46, of grained anodized aluminum plate 44, to provide ink dot 54 with strong adhesion and strong mechanical stability.

Figure 4D:
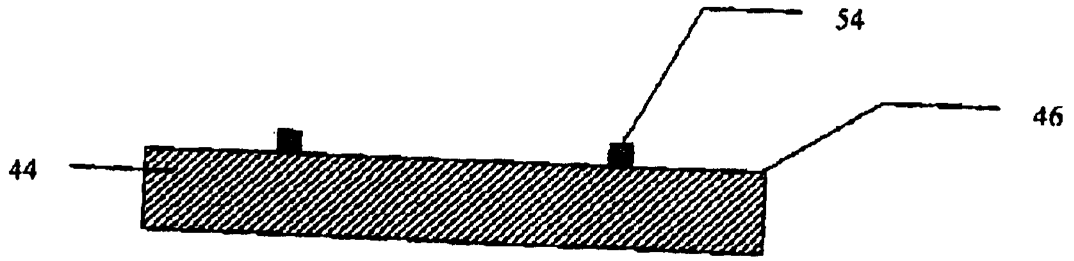

After dot 54 is fused, arabic gum solution is applied to plate 44 as known in the art. Plate 44 is then placed on an offset printing machine, prior to the printing procedure, to expose the grained anodized water-receptive surface 46 with no damage to the image, as illustrated in FIG. 4D.

EXAMPLES

All the examples were made under constant conditions of commercially available uncoated, post-anodized, brushed and electrochemically grained aluminum plates and the CTP liquid as described in Israel patent application no. 132789 with a viscosity of 7.8 centipoise using the inkjet print head described in EP640481. Component concentrations are expressed by [% w/w]. The dot sizes measured on the plate are presented in Table 1 (see Isr. pat. appln. per above).

Example 1

An offset plate was coated using a rubbing motion with a coating solution consisting of 5% butyl carbitol, 3% N-methyl pyrrolidone, 92% deionized water and phosphoric acid, which was added to provide a pH between 1 to 2, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 2

An offset plate was coated using a rubbing motion with a coating solution consisting of 13% Zinc acetate, 3% Calcium chloride, 5% Propyl acetate, 5% Butyl carbitol, 40% ethanol, 34% deionized water, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 3

An offset plate was coated using a rubbing motion with a coating solution consisting of 13% Zinc acetate, 3% Calcium chloride, 5% Butyl lactate, 5% Butyl carbitol, 32% Ethanol and 42% of deionized water, and dried at 50° C. for 30 sec. The plate was then placed on an XY bed where it was imaged, Dpi 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 4

An offset plate was coated using a rubbing motion with a coating solution consisting of 13% Zinc acetate, 3% Calcium chloride of 5% Ethyl acetate, 5% Butyl carbitol, 12.5% Ethanol and 61.5% of deionized water, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 5

An offset plate was coated using a rubbing motion with a coating solution consisting of 13% Zinc acetate, 3% Calcium chloride 5% Butyl acetate, 5% Butyl glycol and 32% Ethanol and 42% deionized water, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 6

An offset plate was coated using a rubbing motion with a coating solution consisting of 13% Zinc acetate, 3% Calcium chloride 5% Propyl acetate, 5% Di(propylene glycol) methyl ether, 40% Ethanol and 34% deionized water, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 7

An offset plate was coated using a rubbing motion with a coating solution consisting of 13% Zinc acetate, 3% Calcium chloride 5% Butyl acetate, 5% Di(propylene glycol) methyl ether, 32% Ethanol and 42% deionized water, and dried at 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Example 8

An offset plate was coated using a rubbing motion with a coating solution consisting of 13% Zinc acetate, 3% Calcium chloride 5% Butyl lactate, 5% Di(propylene glycol) methyl ether, 12% Ethanol and 62% of deionized water, and dried under 50° C. for 30 sec. The plate was then placed on an XY bed where it was imaged, in 600 dpi resolution, (using the inkjet print head described in EP640481 filled with CTP liquid described in Israeli patent application no. 132789) to produce a very sharp 600 dpi quality image by single pass of the head, with no clustering phenomenon. The plate was then coated with acidified gum arabic.

Having described the invention with regard to certain specific embodiments thereof, it is to be understood that the description is not meant as a limitation, since further modifications may now suggest themselves to those skilled in the art, and it is intended to cover such modifications as fall within the scope of the appended claims.

We claim:

1. An aqueous pre-treatment liquid for use in preparation of an offset printing plate having a porous recording surface, for use with direct inkjet CTP, said pre-treatment liquid consisting of:

an ion donor, selected from the group of an inorganic acid and a polyvalent metallic salt, and at least one of:

a polymer swelling reagent, selected from the group of N-methyl pyrrolidone, organic esters, ketones and cyclic ethers, and a coalescence reagent, selected from the group of butyl glycol and glycol ethers, such that when said pre-treatment liquid is applied to said printing plate, it becomes physically localized in the porous recording surface, said ion donor binds chemically to the inkjet drops, and said at least one of a polymer swelling reagent and a coalescence reagent diffuses within the CTP liquid, thereby providing mechanical stability to each of the inkjet drops and enabling the formation of a stable dot shape, having good film properties and very good adhesion to said pre-treated recording surface, resulting in smaller dot size and subsequent improved image quality.

2. The pre-treatment liquid of claim 1 wherein said liquid is a solution.

3. The pre-treatment liquid of claim 1, wherein said liquid is an organic phase emulsion in water, wherein at least one of said swelling reagent and said coalescence reagent are in said organic phase which is emulsified in water containing said ion donor.

4. The pre-treatment liquid of claim 1 wherein said inorganic acid is comprised of an acid from the group of phosphoric, sulfuric, nitric and hydrochloric acid.

5. The pre-treatment liquid of claim 1 where the pH is approximately between 0 and 4.

6. The pre-treatment liquid of claim 1 where the pH is approximately between 1 and 3.

7. The pre-treatment liquid of claim 1 wherein said polyvalent metallic salt includes at least one of divalent and trivalent metallic cations.

8. The pro-treatment liquid of claim 7 wherein said metallic cations are chosen from the group consisting of; $Ca^{+2}$, $Zn^{+2}$, $Ba^{+2}$, $Mg^{+2}$, $Al^{+3}$, $Fe^{+3}$ and $Cr^{+3}$.

9. The pro-treatment liquid of claim 8 wherein said cation comprises between approximately 2% to approximately 25% of said pre-treatment liquid.

10. The pre-treatment liquid of claim 8 wherein said cation comprises between approximately 3% to approximately 20% of said pre-treatment liquid.

11. The pre-treatment liquid of claim 1 wherein said polyvalent metallic salt is comprised of an anion from the group of: $Cl^-$, $I^-$, $Br^-$, $NO_3^-$, $HCOO^-$, $CH_3CH_2COO^-$ and $CH_3COO^-$.

12. The pro-treatment liquid of claim 1 wherein said polymer swelling reagent comprises between approximately 0.1% to approximately 15% by weight of said pre-treatment liquid.

13. The pre-treatment liquid of claim 1 wherein said polymer swelling reagent comprises between approximately 0.5% to approximately 7.5% by weight of said pre-treatment liquid.

14. The pro-treatment liquid of claim 1 wherein said coalescence ragent comprises between approximately 0.1% to approximately 12% by weight of said pre-treatment liquid.

15. The pre-treatment liquid of claim 1 wherein said coalescence reagent comprises between approximately 0.5% to approximately 6% by weight of said pre-treatment liquid.

* * * * *